United States Patent [19]

Rahamim et al.

[11] Patent Number: 5,790,656
[45] Date of Patent: Aug. 4, 1998

[54] DATA ACCESS ARRANGEMENT WITH TELEPHONE INTERFACE

[75] Inventors: Raphael Rahamim, Orange; Robert W. Frankland, Laguna Hills, both of Calif.

[73] Assignee: Rockwell International Corporation, Newport Beach, Calif.

[21] Appl. No.: 536,886

[22] Filed: Sep. 29, 1995

[51] Int. Cl.$^6$ ...................................... H04M 11/00
[52] U.S. Cl. .................. 379/399; 379/90.01; 379/93.09; 379/167; 379/413
[58] Field of Search ........................... 379/399, 93, 94, 379/100, 373, 377, 412, 413, 142, 88, 93.11, 67, 69, 127, 93.09

[56] References Cited

U.S. PATENT DOCUMENTS

| | | | |
|---|---|---|---|
| 4,578,533 | 3/1986 | Pierce | 379/98 |
| 5,377,260 | 12/1994 | Long | 379/93 |
| 5,483,574 | 1/1996 | Yuyama | 379/413 |
| 5,483,577 | 1/1996 | Gulick | 379/67 |
| 5,515,423 | 5/1996 | Beck et al. | 379/93 |
| 5,555,293 | 9/1996 | Krause | 379/405 |
| 5,596,628 | 1/1997 | Klein | 379/93.11 |

*Primary Examiner*—Ahmad F. Matar
*Assistant Examiner*—Jacques M. Saint-Surin
*Attorney, Agent, or Firm*—William C. Cray; Susie H. Oh

[57] ABSTRACT

A data access arrangement (DAA) interface for alternately coupling a telephone set to a modem for operation in conjunction with and independent of the central office power supply line. The DAA interface provides an enhanced power supply to supply adequate power to the telephone set when the telephone set, or a computer coupled thereto, communicates with the modem independent of the central office line. Multiple relays are coordinated and controlled via an application program in communication with the modem which detects certain conditions representing incoming and outgoing telephone and data/facsimile calls, and commands the relays to respond to the conditions.

23 Claims, 4 Drawing Sheets

DATA ACCESS ARRANGEMENT WITH TELEPHONE INTERFACE

BACKGROUND OF THE INVENTION

1. Field of the Invention

The present invention relates to telephone connection architecture for providing necessary conditions to connect a telephone and the central office line to a modem and coder/decoder arrangement to provide alternating voice and data capabilities.

2. Description of Related Art

The ever-changing telecommunications field requires that innovative implementations and uses of existing telephone equipment be merged with new voice and data applications. For example, it is known that voice messages may be digitally recorded, stored, and retrieved by a personal computer (PC) through a modem arrangement. Voice transmission and reception may be performed by a microphone and speaker system coupled to a modem board. However, a less expensive and relatively uncomplicated alternative is to utilize existing microphone and speaker components in a standard telephone set coupled to the modem to provide communications capabilities. For example, the modem/PC/telephone may be configured to serve a telephone answering function by recording and retrieving messages directly through the telephone handset which is already connected to the modem.

To provide the requisite conditions necessary for connecting both the telephone and the central office line to an internal modem data pump and a voice coder/decoder (codec), conformance with all communications agency and telephony requirements must be met. Concurrently, it is desirable to minimize the cost and hardware necessary to implement such telephony requirements.

Figure 3:
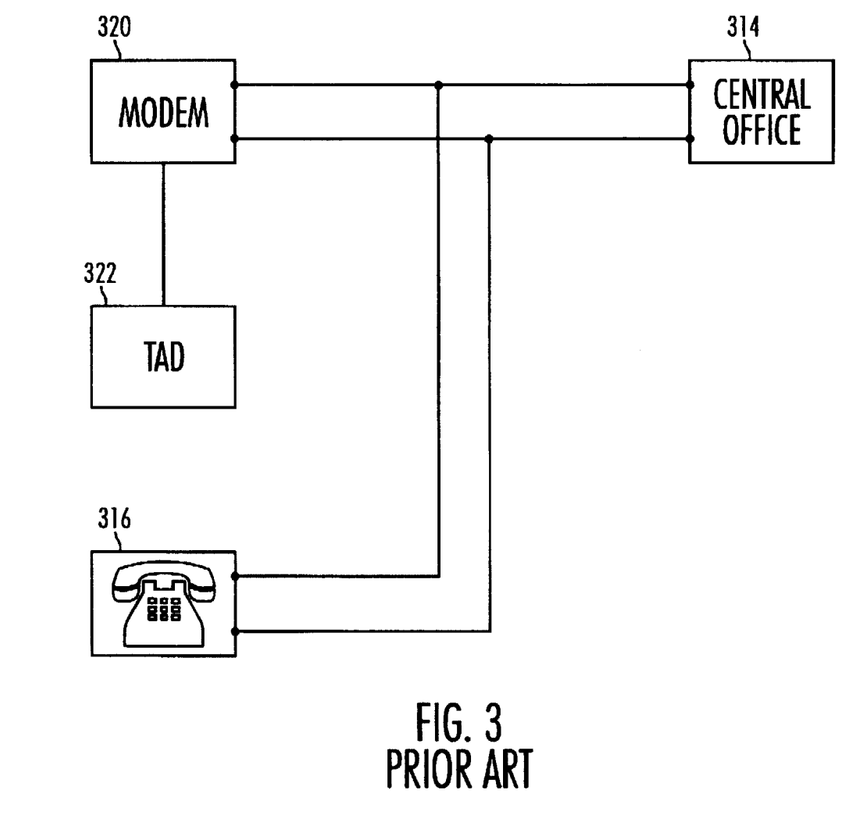
FIG. 3 shows a conventional telephone/modem/answering device configuration.

For example, in conventional telephone answering systems, such as that shown in FIG. 3, a telephone answering device (TAD)322 is typically coupled between the central office line 314 and the telephone set 316 and modem 320 assembly. Conventional telephones generally require line power supplied from the central office across the PSTN or PBX, each of which have unique connection requirements. The central office functions as a switching unit installed in the public telephone system, and includes necessary operating equipment and devices for terminating and interconnecting multiple telephone lines and trunks leading to subscribers' telephone sets. The central office generally provides a nominal 48 volt power supply to the telephone in an on-hook condition across the PSTN.

In some TAD arrangements, incoming and outgoing messages are recorded by a PC through a modem, without a conventional intervening answering device. However, to perform the function of a TAD, a microphone and speaker are required in support of the TAD. To reduce costs and complexity of a PC-based TAD, telephone answering and playback functions, for example, may be provided by a modem coupled to a PC in accordance with a special arrangement through which the telephone handset itself functions as both a microphone and a speaker. By utilizing existing microphone and speaker components in the telephone handset, the conventional telephone can be used both as a microphone into which a user may record an outgoing message or greeting, and as a speaker to play back recorded messages.

However, to use a telephone handset as a microphone or speaker independent of the PSTN and, therefore, the central office, the handset must be disconnected from the central office supply and must be communicatively coupled to the modem. Moreover, regardless whether an attached modem is on or off, the telephone is preferably maintained in a functional state. When supporting telephone answering device functions, the telephone must be disconnected from the central office line and, consequently, must be powered by a complementary source. The desired power supply must provide sufficient voltage and current to independently operate the telephone, yet display voltage/current characteristics similar to that of the central office.

For adequate telephone set performance, the power supply must provide high AC source impedance and low ripple voltage to support and transmit voice data. For example, in the central office supply, the central office trunk circuitry introduces the necessary AC impedance as well as the DC source. Conventional DC voltage sources, however, do not provide these requirements. Because regulated DC power supplies have very low AC output impedance, the voice signal across the telephone handset may be short circuited. Consequently, because both the transmitted and received voice signals are superimposed on the DC supply current, the signals are severely attenuated by the low AC output impedance. Also, due to the 60 Hz cycling of standard 120 V AC wall power supplies (such as that provided by conventional residential sockets), a significant amount of audible noise is generated.

For example, when the telephone set is "cutoff" from the line, the modem must provide an adequate DC supply for the telephone set which would normally be supplied by the central office to the off-hook telephone. However, as explained above, although the telephone power supply must have high AC source impedance to avoid short circuiting the voice signal across the telephone handset, the DC voltage must exceed a certain amplitude to avoid clipping the audio signal. In addition, the modem must now detect the on or off-hook condition of the local telephone just as the central office otherwise would.

Furthermore, other drawbacks include overcoming problems relating to ripple and noise. That is, some digital loads which are tolerant of voltage supply ripple also generate noise which tends to further modulate the supply. In addition, it has been found that conventional external power sources produce an undesirable ripple voltage. As a result, a buzzing or humming sound is often generated across the telephone handset. However, even if the ripple voltage is reduced by a factor of 10, undesirable noise is often still audible on conventional handsets. Consequently, elaborate filtering schemes have been used to eliminate the audible noise in the telephone handset. Such filtering, however, requires additional hardware and substantial cost than is practicable.

When the attached modem is turned off, a user would hear an incoming ring or, upon picking up the telephone handset, a dial tone. However, when the modem is in use and is switched to an off-hook condition, the attached telephone set may be deenergized, or effectively "cutoff" by the modem. In such instances, when the modem is operational, the telephone handset cannot receive or transmit speech signals. When the modem is off-hook, certain conditions must be satisfied. These conditions, as noted above, are necessary to support the local telephone or utility company. For example, a particular range of DC current level must be maintained, or "held," through the central office tip and ring lines to maintain connection to provide adequate transmission of voice signals. By holding the DC current, when the telephone handset is off-hook, additional telephone calls cannot be received since the presence of DC current through the tip and ring signals to the central office that the telephone is in use. Accordingly, an attached modem must simulate the telephone current requirements and, therefore, must satisfy the particular off-hook conditions.

Moreover, in previous telephone/modem connection arrangements, the telephone set was tied to the modem in a variety of complex and complicated configurations to enable communication between the telephone and the modem. For example, in particular conventional circuit configurations, at least five relays have been used previously to control switching between the multiple detection requirements. Such relays may include an on/off hook, caller identification, voice functions, data functions, simultaneous voice and data functions, etc. It has been found, however, that such coupling structures can be substantially simplified by reducing the number of switching relays and thereby optimizing performance, efficiency, and complexity.

SUMMARY OF THE INVENTION

Accordingly, it is an object of the present invention to provide a data access arrangement (DAA) interface which satisfies the conditions necessary for connecting both a telephone and a telephone line to the data pump of a modem and voice coder/decoder ("codec"), while conforming with all agency and telephony requirements. Concurrently, embodiments of the present invention substantially reduce the cost and number of parts, and, therefore, computational resources, required to implement such a DAA connection.

These and other objects are accomplished, according to an embodiment of the invention, by a multi-relay structure which allows for remote configuration of the DAA to transmit modem/fax, caller identification (CID), and voice signals, as well as to provide alternating voice and data communication capabilities, also known as voiceview. Voiceview allows a modem to essentially "view" or monitor the telephone line, and can enable remote and local modems to communicate with each other via the central office line. If both users are connected to separate modem systems, and if both modems have voiceview capabilities, the users may communicate via computers which are coupled to the modems. For example, if a first user would like to transfer data to the second users, the first user's modem will seize the line, disconnect the first user's local telephone, and transmit a particular voiceview tone to the second modem. If the second modem is in a voiceview mode, it will be able to receive and detect the voiceview tone and will, in turn, disconnect the second user from the local telephone set. The users can thus communicate with each other directly via their keyboards.

A bridge rectifier and electronic inductor are provided to support the holding, or maintenance, of the DC loop current in either polarity of the DC. An off-hook relay is coupled between the DC holding circuit and the telephone line. A voice relay controls the connection between the telephone set and the central office telephone line. The voice relay determines whether the telephone handset or the modem will have control over the central office line connection.

CID information arriving between the ring signals is detected by the modem. The user can, upon recognizing the caller's telephone number, either respond or ignore the incoming call. This can also be preprogrammed into the attached PC, which controls the modem to react accordingly. The CID relay, in its active state, is used to route the CID signal to the modem. When energized, the relay allows data and facsimile functions to work. In addition, a ring detection circuit is provided for enabling the modem to detect an incoming ring signal.

A DC supply is provided to power up the telephone set when the telephone set is actively coupled to the modem via the voice relay. The power supply is configured as a constant current source, and includes a voltage regulator coupled to a resistor. A voltage reference circuit is coupled between the DC supply and the telephone set when the voice relay disconnects the central office line. Due to differences between telephone sets, the voltage reference circuit ensures that sufficient voltage and current is provided. Such an arrangement has been found to be an adequate substitute to the current supplied by the central office while still supporting almost all conventional telephones used on the market today.

BRIEF DESCRIPTION OF THE DRAWINGS

The detailed description will be made with reference to the accompanying drawings, wherein like numerals designate corresponding parts in the several figures.

DETAILED DESCRIPTION OF THE PREFERRED EMBODIMENTS

Embodiments of the present invention have been found to provide high quality voice and data communication capabilities in conjunction with as well as independent of the central office line power supply. According to preferred embodiments of the invention, the DAA of the present invention provides for data/facsimile functions using a modem and personal computer arrangement coupled to the central office line. The DAA also enables a telephone set to perform a voice function as part of an answering machine through which messages may be recorded and retrieved in conjunction with a modem and PC assembly.

For example, telephone embodiments of the present invention allow the telephone set to perform the role of a microphone and speaker system as in a telephone answering device when used in conjunction with an application program (not shown), a PC, modem, and an independent power supply. Additional function-specific equipment typically associated with an answering machine is not generally necessary. Thus, the telephone handset may be used to provide a microphone to record a greeting message and a speaker to play back recorded messages, as well as to receive and respond to control messages.

For adequate telephone set performance independent of the central office line, however, the power supplied to the telephone must have characteristics similar to those of the central office supply. That is, adequate AC source impedance and low ripple voltage are necessary to achieve an undistorted, noise-free audible voice signal. DAA embodiments of the present invention provide such capabilities, with reduced complexity and fewer components.

Figure 1:
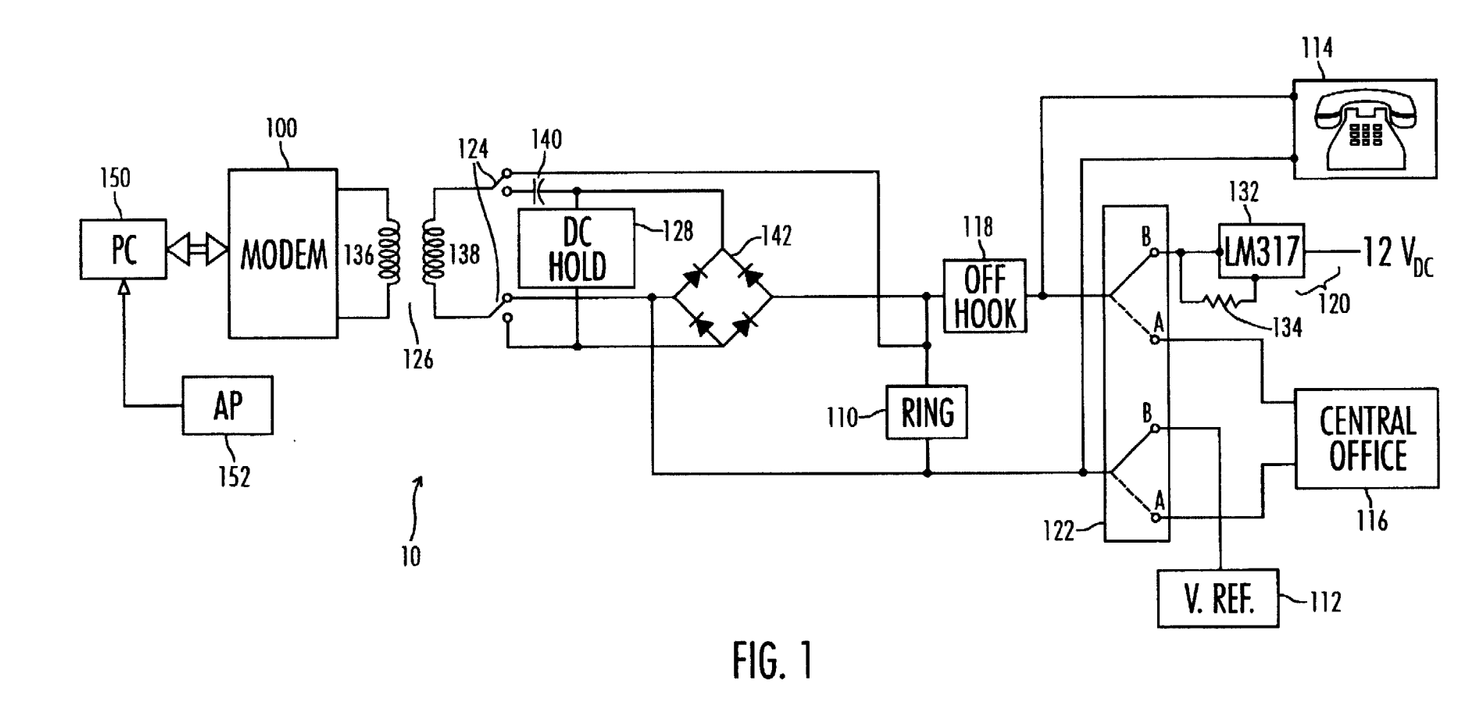
FIG. 1 is a block diagram of a data access arrangement in accordance with an embodiment of the present invention.

The data access arrangement (DAA) 10 in accordance with a preferred embodiment of the present invention is indicated generally in FIG. 1. The DAA includes multiple relays and circuitry associated with a modem microcontroller 100 and its connection to the central office line 116, i.e., the tip and ring. The modem microcontroller 100 issues control signals in accordance with a computer 150 programmed with software 152 to control the switching of the various relays incorporated within the DAA. Modem control signals are then issued in response to the incoming call or signals being processed. The control signals will vary in response to the detection by the computer of a modem data and/or facsimile transmission, or a voice communication between the modem and the telephone set directly in instances where the telephone set receiver is used as a recording/speaker medium for storage/playback via the modem. As will be discussed in more detail below, the functions of the multiple relays depends on the instructions provided by the modem microcontroller 100.

Figure 2A:
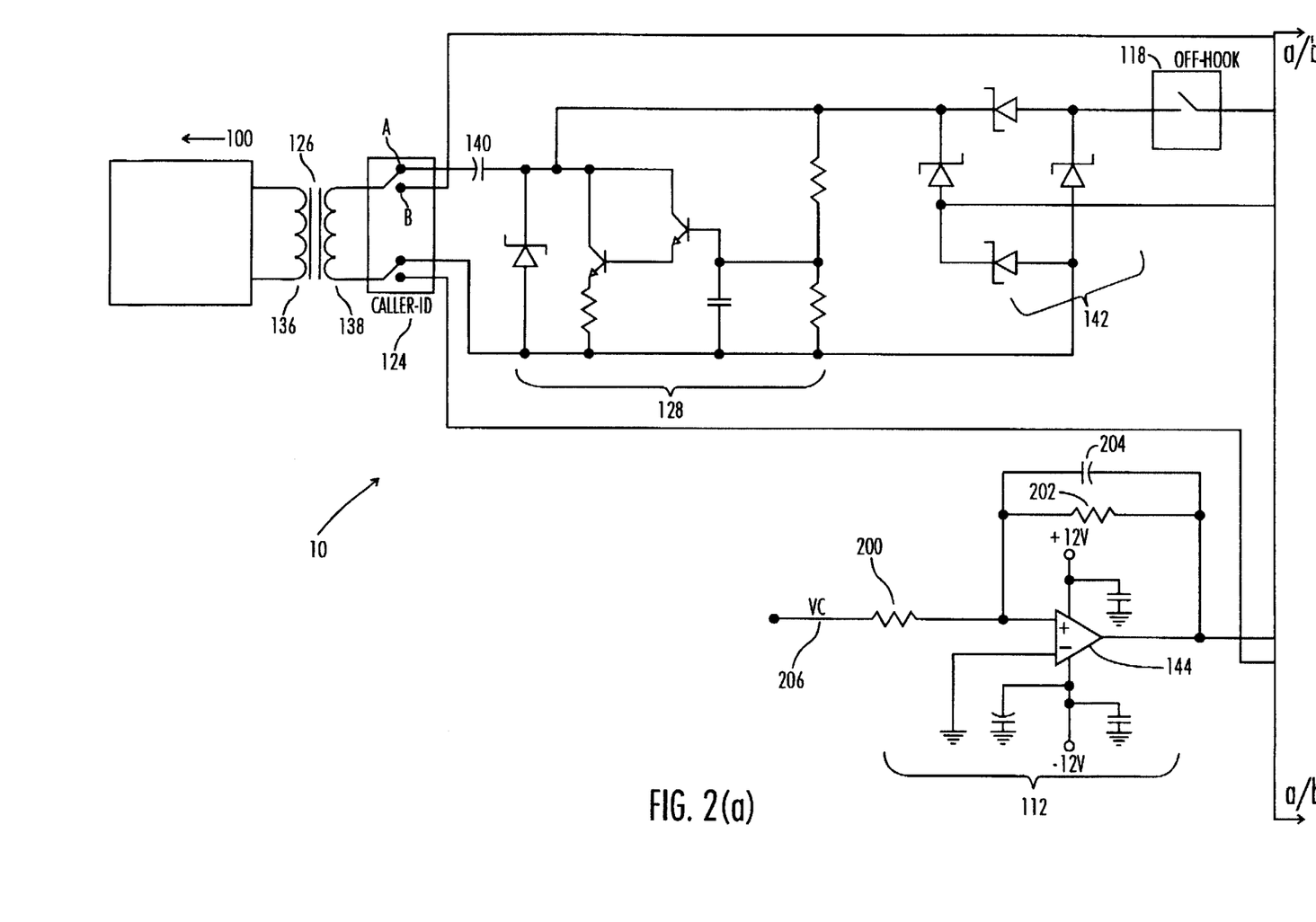
FIGS. 2(a) and 2(b) are a schematic of a preferred embodiment of the data access arrangement of the present invention.
Figure 2B:
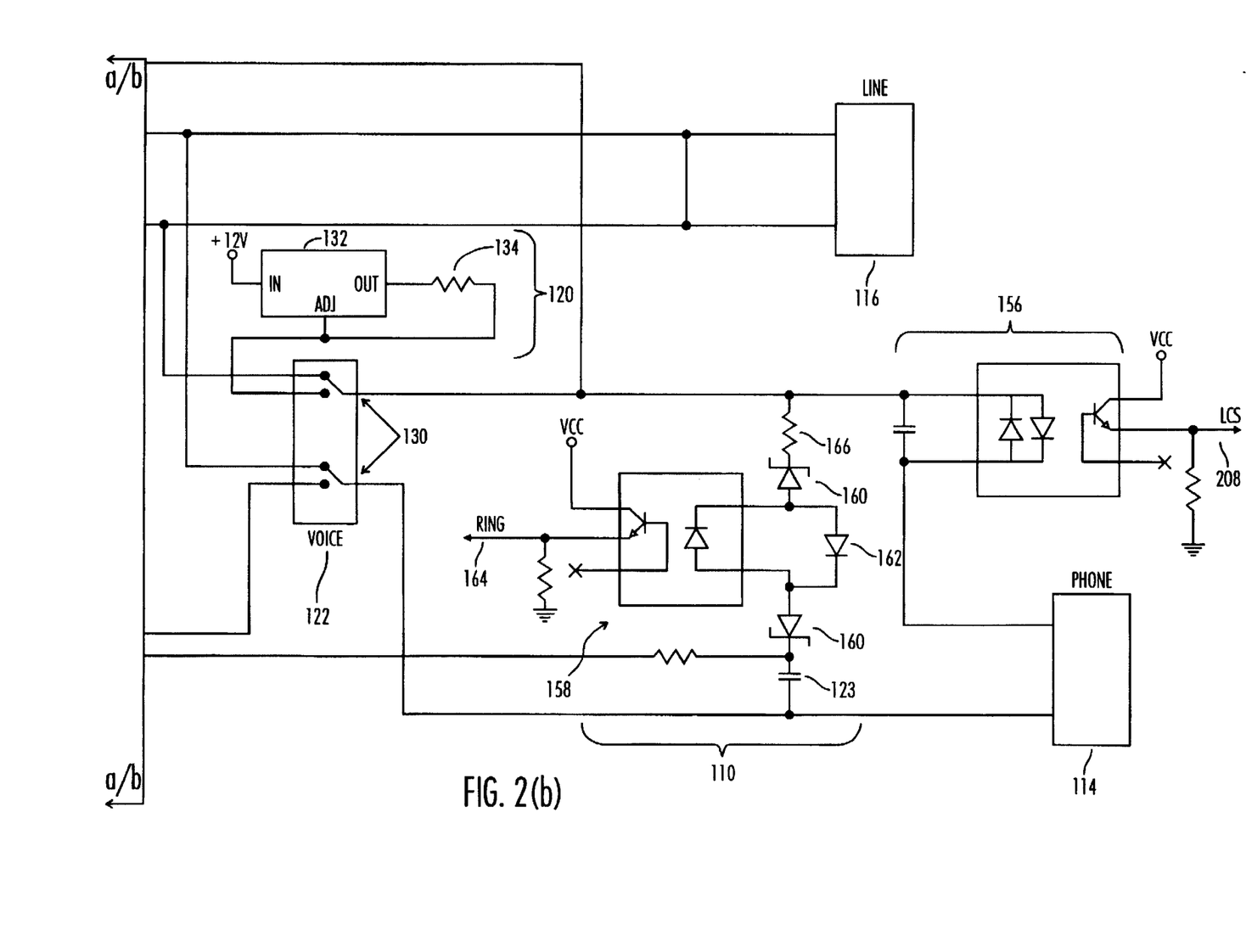

The modem may comprise a stand-alone modem coupled to a PC 150 across a serial communications port, such as an RS232 interface connector, or the like. Power to the modem may be provided externally through any conventional power source. The modem may also be connected internally within the PC. Preferably, the modem power supply will not be affected by and should not affect the telephone DC supply. Referring to FIGS. 1, 2(a) and 2(b), a transformer 126 couples the modem to the DAA 10. In preferred embodiments, the transformer ratio between the transformer legs 136 and 138 is one-to-one. Consequently, the varying voltage and current levels across transformer leg 138 are reflected in transformer leg 136. The variable voltage representing the varying voice and modem signals can then be processed by the modem and PC assembly.

Thus, the telephone set connection may be alternated between the central office line 116 and the current source 120. The telephone set 114 will be coupled to the current source when direct voice communication is desired between the telephone handset 114 and the modem 100, without central office 114 intervention. On the other hand, for direct data/facsimile communication between the modem 100 and the central office line 116, regardless whether a local telephone set 114 is coupled in some configuration to the modem/central office line connection, the modem connection is directed to the central office line. That is, the telephone set may also be alternately disconnected by switching the modem 100 to the central office line 116 to either receive or transmit data or facsimile information across the line, without any voice communication through the telephone handset.

1. Voice Communication Between the Telephone Set and the Modem

FIGS. 2(a) and 2(b) show in more detail the telephone set 114, modem 100, and DAA 10 arrangement according to preferred embodiments of the present invention. The telephone system is shown connected, via relay 122 to current source 120. The current source 120 is provided to power up the telephone set 114 when the telephone set is actively coupled to the modem 100 via the voice relay 122, comprised of contacts 130. In such cases, as explained above, the telephone set may be used as a recording or answering system, or for other lineindependent purposes. The relay 122 also provides a default mechanism to connect the telephone set to the line whenever the modem power is turned completely off.

The power supply 120 is configured as a constant current source, which includes an adjustable voltage regulator 132 and resistor 134 coupled between the adjustment and output pins of the voltage regulator 132. The resistor 134 and voltage regulator 22 configuration serves to regulate the output current at the adjustment pin of the regulator. The output current is determined, and thus set, by the value of the resistor 134. Consequently, a constant current is presented to the telephone set, allowing the voltage output across the telephone handset to vary according to the variable transmitted audio signal. The constant current which passes through the telephone generates a DC voltage across the telephone which is proportional to its internal resistance. That is, by adjusting the value of the resistor 134 coupled to the voltage regulator 132, the output current can be controlled to provide a particular operating voltage to the telephone handset in use.

For example, when an audio signal is input into the telephone handset receiver (not specified in detail), the resistance varies, but the current is constant. Consequently, a corresponding variable voltage is produced across the transformer 126 coupled between the telephone set 114 and the modem 100. If the telephone handset and transformer arrangement comprises a typical 300 ohm DC impedance, and if a voltage of 12 volts is input into the voltage regulator, a 20 mA current source will be output to produce the necessary 6 volt drop across the handset. Such an arrangement has been found to sustain and maintain the desired voice signal, while substantially eliminating audible ripple voltage. As noted above, other currents, e.g. 15 mA, may be set by changing the resistance of resistor 134.

In cases where the telephone set may have a very high DC impedance, the 12 volts provided by a host PC will not be able to drive sufficient DC current through the telephone set for the regulator to provide constant current. Accordingly, in preferred embodiments of the present invention, to support such cases, a voltage reference circuit 112 is coupled between the current source 120 and the telephone set 114 when the voice relay 122 disconnects the central office line 116. The voltage reference 112, which provides −5 volts, in combination with the current source 120, enables the modem 100 and telephone set 114 to communicate directly with each other, independent of power supplied by the central office line 116. Due to differences between different telephone sets, the voltage reference circuit ensures that sufficient voltage is provided.

It will be recognized that the preferred voltage reference circuit may be configured to drive additional signals, such as voice signals or other tones, etc., to the telephone set. Due to the construction of the voltage reference, it may be used to add additional AC signals to further supplement a variety of telephony functions.

A voice relay 122 controls the connection of the telephone set 114 and the central office telephone line 116 to the modem 100. The voice relay 122 disconnects the telephone set 114 from the central office line 116 to prevent the local telephone set 114 from interfering with the modem signals. For voice applications, the modem instructions and commands are preferably controlled by software and/or firmware, as in a program stored in a ROM or EPROM, which instructs the modem 100 to connect to the telephone set 114 when the telephone handset goes off-hook.

In preferred embodiments, the switching of voice relay 122 is controlled by an application program (AP), EPROM code, or other compatible software or hardware, installed and activated in the PC. Preferably, the AP is operable in a variety of modes, such as manual or automatic. For example, if the voice relay 122 is switched to decouple the telephone set 114 from the central office line 116, the line 116 could be taken off-hook via the off-hook relay 118. At this time, the telephone set is cut off and the DC hold circuit 128 maintains the DC requirements of the central office tip and ring 116.

In a standard modem, a 5 volt power supply connection is typically available to supply power to externally-connected components. However, to be used for the telephone DAA, the power supply must be clean to reduce audible interference with the voice signal. This internal supply must be substantially filtered to effectively "clean up" the signal, which would otherwise tend to result in a 2 to 3 volt loss. Consequently, to satisfy the many telephones and telephone system requirements throughout the world, the variable-level voltage reference in DAA embodiments of the present invention provides a clean voltage supply to satisfy the power requirements of almost any type of telephone.

More particularly, the voltage reference circuit 112 includes an operational amplifier 144 provided with a ±12 V input 208. The positive input pin is coupled to ground, while the negative input pin is connected to the modem 100 and tied to the output feedback loop. In preferred embodiments, resistor 200 and capacitor 202 coupled to the negative input of amplifier 144 provide a gain of −2. Resistor 200 is coupled to a clean voltage source 206 which is typically 2.5 volts. The voltage source 206 is the reference voltage internally generated by the modem device 100 for its own use, which is thus noiseless relative to other modem functions. As a result, this configuration yields −5 volts at the output of amplifier 144, where 2.5 V*(−2)=−5 V.

This −5 volt supply comprises the reference voltage discussed above. Thus, as the voltage supply 206 itself provides a clean voltage source, by multiplying the voltage with the gain value, a clean reference voltage is also provided. As a result of this configuration, and together with the +12 volt supply provided externally, e.g., by the host computer system, a total of 17 volts is provided to power up the telephone set. Unlike the "dirty" internal power typically supplied by the modem or the wall line, e.g., the 12 volt power supplied by the external source, the current source/voltage reference arrangement provides a substantially clean voltage between +12 volts and −5 volts.

Thus, when the voice relay 122 is switched to connect the telephone set 114 to the modem 100 when off-line voice communication is desired, it can be seen that the telephone set 114 is coupled at one end to the current source 120 and, at the other end, to the voltage reference 112. For the telephone set 114 to "talk" to the modem 108, the caller identification relay 124 must be energized by coupling the telephone set 114 (supplied with the proper DC current) to the transformer 126. At this time, the computer or host application program, which controls the off-hook relay 118 maintains the off-hook relay in a de-energized state. This coordination of conditions allows the modem to communicate with the telephone set in the same manner as it would communicate with the central office line 116. An example of the sequence of events for a particular telephone to modem application is discussed in more detail below.

2. Modem Data/Facsimile Communications

Assuming that the modem operation starts in an idle state, for modem communications directly with the central office line in cases of data or facsimile transmission and receipt, the voice relay 122 and the off-hook relay 118 are deenergized, allowing both the modem and local telephone set to respond to incoming rings. Upon detection of an incoming ring, the voice relay 122 will be switched to disengage the telephone set from he line in order to prevent possible interference with data and fax signals. Concurrently, the off-hook relay 118 will be energized, resulting in the seizure of the line.

Referring to FIG. 2(a), a DC holding circuit 128 is provided for holding, or maintaining, the DC loop current in an off-hook condition. Preferably, the DC holding circuit 128 includes an electronic inductor which provides an electrical replacement for a conventional coil inductor. In preferred embodiments, the DC holding circuit 128 presents a low impedance to the DC current supplied by the central office, and high impedance to the AC. Since an AC voltage must be presented to the modem while riding on the DC, a sufficient DC voltage must be maintained. Thus, the electronic inductor effectively clamps the DC voltage, preferably between 6–13 volts. The clamped voltage depends on the amount of current flowing through the circuit, and is affected by the distance to the central office. Preferably, such DC levels allow for AC signals of ±3 volts to be superimposed on the DC without clipping.

An off-hook relay 118 is coupled between the DC holding circuit 128 and the central office telephone line 116. In a modem data/fax case, when a modem function is activated, the off-hook relay 118 closes to connect the central office line 116 to the DC holding circuit 128. The amount of DC current flowing is generally dependent on the length of the central office line. A modem signal can then be sent across the line, over the DC current. Thus, the DC level must be maintained at a particular amplitude. Concurrently, the DC holding circuit 128, while holding the DC current, must be transparent to the transmitted modem signal without contributing to distortion. When the off-hook relay 118 closes in response to a modem command which connects the modem 100 to the central office line 116, the DC holding circuit 128 is self-activating so that the modem can seize the line. The voice relay 122 is also activated. In this way, a user may not interfere with a modem transmission by picking up the telephone handset 114.

In a typical modem data/fax connection, the off-hook relay 118 closes when a telephone call is received and recognized by the modem. The off-hook relay 118 also closes for outgoing transmissions. As the polarity of the DC voltage on the telephone line is undetermined, a bridge rectifier 142 is provided to produce a DC voltage of known polarity to operate the DC holding circuit 128. Proper functioning of the DC holding circuit 128 can only be achieved when the proper polarity is attained. As noted above, the DC resistance of the holding circuit 128 is necessarily very low, while the AC impedance is high to cause all of the AC signals between the local modem and a remote modem to pass through the transformer 126. Conversely, because the transformer 126 is easily saturated by the DC current, the AC signal is coupled to the transformer 126 through capacitor 140 to prevent DC current from flowing into the transformer.

A loop current sensor 208 supplies information to a host computer control program which uses this data in its decision-making process. For example, if the modem is requested to perform data functions, the control program will poll the output of the loop current sense circuit 208. The loop current signal 208 is coupled to optocoupler device 156 which senses loop current. If the loop current sense signal 208 is found to be asserted, i.e., is active, the control program will recognize this condition as essentially a "telephone in use" and will prevent the modem from going off-hook. More particularly, the loop current sense circuit 156 operates as follows. At any time that the telephone set is off-hook, whether connected to the central office line 116 or to the modem 108, a DC current is flowing through both the telephone set 114 and the optocoupler 156. The optocoupler 156 reacts to the DC current flowing through by asserting the loop current sensor 208, indicating to the modem 108 that the telephone set is off-hook. This will occur whether or not the voice relay 122 is energized.

As indicated in FIG. 2(a), a caller identification (CID) relay 124 is coupled to the modem/transformer arrangement to switch the modem connection to either the DC holding circuit 128 or to the line 116 via the voice relay 122 and capacitor 123. Upon identification of an incoming ring, the host control program will energize the CID relay 124 and the CID information will be received from the central office line 116 via relay 122 and capacitor 123. The CID signal is sent by the central office immediately after the first ring. The modem, after detecting the first ring by the ring detect circuit 110, will then energize the CID relay 124.

When the CID relay is energized, the modem is effectively "listening" to the incoming call to determine the calling number. The modem can then decipher the telephone number of the calling party. The CID information may be used in several ways. The CID may be displayed to the user to allow the user to decide whether to pick up the telephone handset, or allow the modem to retrieve the call via an off-hook command signal. Otherwise, the host program may review the CID and decide whether to answer the call.

Preferably, the CID relay 124 may be initiated automatically or manually. For example, if the user would like a determination of the identity of the caller, the CID relay may be manually energized. Once the caller is identified, the CID relay 124 may be manually or automatically switched back to connect the modem 100 to the current holding circuit 128.

Referring to FIG. 2(b), incoming rings are detected simultaneously by the user (alarmed by the sound of the telephone bell) and by the modem via the ring detect circuit 110. The ring voltage which arrives from the line 116 is comprised of high voltage alternating current, e.g., 90 Vrms. Upon arriving at the line input 116, the ringing voltage is steered to the ring detect circuit 110 via the voice relay 122. As a result, current begins to flow through diodes 160, resistor 166, the optocoupler 158, and capacitor 123. The current flowing through the optocoupler 158 then asserts the ring detect signal 164. Diode 162 protects the optocoupler 158 from reverse voltages.

3. In Operation

As shown in FIGS. 1, 2(a) and 2(b) which depict embodiments of the present invention, DAA embodiments include multiple relays which are controlled by the modem control signals. More particularly, in accordance with predetermined software or an AP installed in an attached PC or programmed into the modem itself, the modem microcontroller 100 issues signals to coordinate the switching of each of the relays in response to incoming telephone calls, as well as to control direct communication and storage of information between the modem and the telephone set. A variety of calling scenarios may be accommodated. If a telephone call is received and the caller's telephone number is determined, and if the modem is programmed to respond to the particular calling number as a facsimile machine, the off-hook relay 118 will connect the modem to the central office line and the DC holding circuit 128 will maintain the required current level to support the fax transmission.

For example, after a predetermined number of incoming rings is received and detected by the ring detect circuit 110, the modem may be instructed to go off-hook via the AP in conjunction with the off-hook relay 118. The modem and PC are thus connected to the central office line 116. If the modem determines that the incoming call is a voice call, and a message is to be recorded, it will play back a stored greeting message, and then record any incoming message on the PC. In preferred embodiments of the present invention, to retrieve the stored recorded message, a user may manually type in a command on the PC keyboard to disconnect the central office line 116 and redirect the telephone set connection to the independent power supply 134. Consequently, when the telephone handset 114 is taken off-hook, a dial tone will not be heard since the modem is occupied while the recorded message is played back over the telephone handset 114.

According to embodiments of the invention, the AP is preferably user-configurable such that the computer can be manually or automatically instructed to operate in a particular way depending on a specified input command. As a result, the telephone set and computer assembly may be switched independent of the central office power supply line 116, to operate as an independent telephone answering device. For example, if the PC is running an AP such as XTALK™ or PCPLUS™ and the modem is in a "command mode," a typed-in keyboard command AT#CLS=8 will cause the voice relay 122 to switch from the central office line 116 to the independent power supply 120.

If the issued keyboard command indicates that the user would like to dial a particular telephone number and send information, e.g., a facsimile, to another operator, the modem will signal the off-hook relay to seize the line. The modem controller will concurrently determine that the telephone set should be disconnected from the modem/central office line connection. Accordingly, another AT-type command will be issued to cut off the telephone set function. A data or facsimile transmission may then be processed through the modem controller 100 and the central office line 116 without interruption by the local telephone set 114.

In another example, more generally and in accordance with preferred embodiments of the invention, if a user 1 originates a telephone call to a user 2, user 2's ring detect circuit detects the incoming ringing from the user 1 call, and transmits the indication of the call to the host computer (of user 2) which, depending upon the installed program, will activate the CID relay. The CID is then detected and reported by the modem to the to the receiving party, user 2. User 2 can then decide to either answer the call by picking up the handset or allow the modem to pick up the call. It should be noted that the computer coupled to the modem provides for a variety of responses. For example, if a particular CID is indicated, the computer may determine that the modem will immediately retrieve the call, or that such a call will not be answered, or that the particular calling number is always for facsimile transmissions.

Once the CID information has been passed to the user 2, the CID relay is deenergized. If user 2 decides not to pick up the phone, or is unavailable, the computer/modem assembly will retrieve the call after a predetermined number of rings (as controlled by the computer program). If user 2 decides to pick up the telephone handset, loop current sense will be established and detected by the loop current sense circuit. Accordingly, the LCS pin will be asserted. Thus, if user 1 and user 2 are talking and the LCS has been asserted, the voice relay will maintain the telephone set connection to the central office line for the voice communication.

If both modems have voiceview capabilities, data or files may be transferred between the users. Preferably, this transfer of data is initiated by a user, e.g., user 2, using a keyboard command. The data transfer command causes user 2's voice relay to switch the line connection from the local telephone set to the modem 2 (coupled to user 2's computer). Modem 2 then sends a voiceview "start" tone across the central office line to user 1's modem, which detects the voiceview tone and transmits a signal to its own voice relay (of user 1) to activate the modem connection, thereby seizing the line and disconnecting the local telephone set. A modem handshake between modem 1 and modem 2 establishes the modem/computer connection. The file or data transfer can then be performed. When the file/data transfer is completed, a "stop" tone is transmitted, such that the corresponding computers will reverse the voice relay connections to reconnect the respective local telephone sets to the central office lines. It will be recognized that, depending upon the particular computer program arrangement, the line connection between modem 1 and modem 2 may be automatically disconnected without intervening reconnection to the associated telephone sets.

It will, of course, be understood that other modifications of the present invention, in its various aspects will be apparent to those skilled in the art, some being apparent only after study, and others being matters of routine analog and digital data access arrangement design and fabrication. As such, the scope of the invention should not be limited by the particular embodiments herein described, but should be defined by the appended claims and equivalents thereto.

What is claimed:

1. A data access arrangement (DAA) for coupling a local modem to a local telephone set across a single telephone line, in communication with a central office line, wherein the modem responds to signals received across the telephone set, the DAA being operable with program means for controlling communication between the modem and the telephone set, and for directing the modem to process the incoming signals received across the single telephone line through the telephone set, and for controlling the connection of the telephone set to the central office line, such that the single telephone line enables transmission of voice and data signals the DAA comprising:

a current source adaptively coupled to the telephone set, the current source including:

a current regulator for providing a constant current to the telephone set when the telephone set is disconnected from the central office line, wherein a variable voltage is produced across the telephone set which varies according to the signals received across the telephone set, the current regulator operable with an input voltage, and a voltage reference circuit coupled to the current regulator, for enhancing the input voltage supplied to the telephone set; and a voice relay for switching the connection of the telephone set between the central office line and the voltage regulator and voltage reference assembly in response to the program means, wherein for the modem and telephone set to communicate directly with each other independent of the central office line, the program means causes the relay to connect the telephone set to the voltage regulator and voltage reference assembly, thereby disconnecting the telephone set from the central office line.

2. The DAA of claim 1, wherein the telephone calls are received and transmitted across the central office line, the DAA further comprising an off-hook relay coupled to the modem for connecting the modem to the central office line, wherein the program means causes the off-hook relay to connect the modem to the central office line, such that the modem can transmit a telephone call or receive a telephone call.

3. The DAA of claim 1, further comprising a loop current sense circuit for detecting whether the telephone set if connected to the central office line or to the modem independent of the central office line.

4. The DAA of claim 1, wherein the incoming telephone calls are indicated by rings, the DAA further comprising:

ring detection means coupled to the central office line and in communication with the program means, the ring detection means for detecting ringing representing incoming telephone calls, and for indicating the ringing to the program means, which determines the number of rings; and an off-hook relay coupled to the modem for connecting the modem to the central office line after a predetermined number of rings is determined by the program means, wherein the program means causes the modem to be connected to the central office line, such that the modem can receive and process the signals transmitted across the central office line.

5. The DAA of claim 4, wherein the modem is adapted to receive a DC current, the DAA further comprising a DC holding circuit coupled to the off-hook relay for maintaining a substantially constant DC current flow between the modem and the central office line.

6. The DAA of claim 1, wherein the voltage reference circuit amplifies the signals transmitted to the telephone set.

7. The DAA of claim 1, wherein the voice relay comprises a dual pole dual throw relay for switching the telephone set connection between the current regulator/voltage reference and the central office line.

8. The DAA of claim 1, further comprising:

a computer coupled to the modem; and means for enabling the modem and telephone set to communicate with the computer via the program means.

9. The DAA of claim 1, wherein the current regulator comprises:

an adjustable voltage regulator having an input terminal, an output terminal, and an adjustment terminal; and a resistor connected between the output terminal and the adjustment terminal of the voltage regulator, wherein when the voice relay switches the telephone set to the current regulator, the constant current is output from the voltage regulator and supplied to the telephone set.

10. The DAA of claim 1, wherein the voltage reference includes:

an amplifier having a negative input pin, a positive input pin, and an output pin, the output pin being coupled to the voice relay, wherein when the voice relay connects the telephone set to the current source, the telephone set is connected to the output pin of the amplifier;

an external voltage source coupled to the negative input pin of the amplifier;

a first resistor coupled between the external voltage source and the negative input pin of the amplifier; and a feedback resistor connected between the output pin and the negative input pin of the amplifier, wherein the connection between the first resistor and the feedback resistor and the amplifier provides a negative gain value, such that the voltage output at the output pin of the amplifier equals the gain value multiplied by the external voltage source.

11. The DAA of claim 1, further comprising monitoring means for enabling the modem to monitor the telephone set and central office line connection to identify the signals transmitted across the central office line and the telephone set, such that the program means can alternate the connections of the telephone set and the modem to each other and to the central office line.

12. The DAA of claim 10, further comprising a remote modem coupled to a remote telephone set which in turn is coupled to the local telephone set and local modem across the central office line, wherein the monitoring means includes:

first data transfer means coupled to the local telephone set and local modem, and in communication with the program means, for transmitting and receiving signals directly between the local modem and the remote modem, independent of the local telephone set and the remote telephone set, respectively; and second data transfer means coupled to the remote telephone set and remote modem for transmitting signals to and receiving signals from the local modem.

13. A data access arrangement (DAA) for operatively coupling a modem to a telephone set and a central office line, and for enabling the modem to communicate directly with the central office line across a single telephone line and for enabling the modem to communicate across the same single telephone line directly to the telephone set independent of the central office line, wherein the modem responds to incoming telephone calls which may include voice signals, data signals, and facsimile signals, the incoming telephone calls being represented by ringing, comprising:

program means for controlling the connection of the modem in response to incoming telephone calls across the single telephone line;

an off-hook relay coupled to the program means for connecting the modem to the central office line in response to a command from the program means; and a ring detector coupled to the program means and modem for detecting ringing representing incoming telephone calls, and for indicating the ringing to the program means, wherein after a predetermined number of rings is determined, the program means commands the modem to connect the modem to the central office line to enable the modem to receive and store any incoming voice, data, and facsimile signals.

14. The DAA of claim 13, wherein the central office line provides a DC current supply, the DAA further comprising a DC holding circuit coupled to the modem for maintaining DC current flow to the modem when the modem is off-hook.

15. The DAA of claim 13, wherein incoming telephone calls have corresponding caller identification (CID) information, the DAA further comprising a CID relay connected to the modem and the program means for identifying the CID of an incoming telephone call, wherein the program means controls activation of the CID relay, such that when the CID relay is energized, the CID relay enables the communication of the CID to the program means, further wherein, depending upon the CID, the program means commands the modem to retrieve the incoming call, and causes the off-hook relay to connect the modem to the central office line.

16. A system for operatively coupling a modem to a telephone set independently or in conjunction with a central office line, wherein, depending upon the status of incoming and outgoing calls, the system enables the modem to communicate directly with the telephone set without central office line power, and also enables the modem to respond to incoming calls and to send outgoing calls over the central office line carrying DC current supplied by the central office line, further wherein when the modem is coupled to the telephone set and disconnected from the central office line, the modem can receive voice signals across the telephone handset, and when the modem is coupled to the central office line, the modem can receive data signals, fax signals, and voice signals, the system comprising:

a computer programmed to provide commands to connect the modem to the central office line and to the telephone set;

a DC holding circuit coupled to the modem for maintaining a substantially constant DC current flow to the modem when the modem is coupled to the central office line;

an off-hook relay in communication with the computer for receiving computer commands and for disconnecting the modem from the central office line;

a caller identification (CID) relay connected between the modem and the DC holding circuit for identifying an incoming call, wherein the computer controls energization of the CID relay such that when the CID relay is energized, the computer is able to identify the incoming telephone call, such that, depending upon the CID, the computer instructs the off-hook relay to connect the modem to the central office line; and a power supply adaptively coupled to the telephone set and modem, for supplying power to the telephone set independent of the central office line, the power supply including:

a current regulator for providing a constant current to the telephone set independent of the central office line, the current regulator operable with an input voltage supply, a voltage reference circuit coupled to the telephone set in cooperation with the current regulator, for enhancing the input voltage supplied to the telephone set independent of the central office line, a voice relay coupled to the current regulator and the voltage reference circuit for switching the connection of the modem and telephone set between the central office line and the current regulator and voltage reference circuit assembly, wherein (1) if the incoming and outgoing call includes data, facsimile, or voice signals or upon a particular identification of an incoming call by the CID relay, the computer commands the voice relay to disconnect the telephone set from the central office line, and (2) for communication of voice signals directly between the telephone set and the modem independent of the central office line, the computer causes the voice relay to connect the modem and telephone set to the power supply.

17. The system of claim 16, wherein when the modem and telephone set are coupled to the power supply, the telephone set provides microphone and speaker functions for receiving and transmitting voice signals, respectively, such that in response to computer commands, the modem can store the voice signals and can retrieve and playback any stored voice signals through the telephone set.

18. The system of claim 16, further comprising a transformer coupled between the modem and the CID relay for providing high-voltage isolation, the transformer having first and second coils magnetically linked to transfer electrical energy between the central office line, the telephone set, and the modem.

19. The system of claim 16, wherein the voice relay comprises a dual pole dual throw relay for switching the telephone set connection between the current regulator/voltage reference and the central office line.

20. The system of claim 16, wherein the current regulator comprises:

an adjustable voltage regulator having an input terminal, an output terminal, and an adjustment terminal, and a resistor connected between the output terminal and the adjustment terminal of the voltage regulator, wherein when the voice relay connects the telephone set to the current regulator, the constant current is output from the voltage regulator and supplied to the telephone set.

21. The system of claim 16, wherein the voltage reference includes:
- an amplifier having a negative input pin, a positive input pin, and an output pin which is coupled to the voice relay, wherein when the voice relay connects the telephone set to the power supply, the telephone set is connected to the amplifier output pin;
- an external voltage source coupled to the negative input pin of the amplifier;
- a first resistor coupled between the external voltage source and the negative input pin of the amplifier; and
- a feedback resistor connected between the output pin and the negative input pin of the amplifier, wherein the connection between the first resistor and the feedback resistor and the amplifier has a negative gain value, wherein the voltage output at the output pin of the amplifier equals the gain value multiplied by the external voltage source.

22. The system of claim 16, wherein incoming calls are indicated by rings, the system further comprising a ring detect circuit coupled to the telephone set for detecting the number of rings of an incoming call.

23. The system of claim 16, further comprising voiceview means having associated voiceview signals, the voiceview means for monitoring the telephone line to detect voiceview signals, wherein if a voiceview signal is detected, data communication is initiated.

* * * * *